United States Patent
Asayama et al.

(10) Patent No.: US 11,530,993 B2
(45) Date of Patent: Dec. 20, 2022

(54) DEPOSIT DETECTION DEVICE AND DEPOSIT DETECTION METHOD

(71) Applicant: DENSO TEN Limited, Kobe (JP)

(72) Inventors: Nobunori Asayama, Kobe (JP); Nobuhisa Ikeda, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 239 days.

(21) Appl. No.: 17/019,576

(22) Filed: Sep. 14, 2020

(65) Prior Publication Data
US 2021/0088456 A1  Mar. 25, 2021

(30) Foreign Application Priority Data
Sep. 20, 2019  (JP) .............................. JP2019-172217

(51) Int. Cl.
*G01N 21/94* (2006.01)
*G06T 7/00* (2017.01)
*G06T 7/11* (2017.01)

(52) U.S. Cl.
CPC ........... *G01N 21/94* (2013.01); *G06T 7/0004* (2013.01); *G06T 7/11* (2017.01)

(58) Field of Classification Search
CPC ............ G01N 21/94; G01N 2021/8887; G06T 7/0004; G06T 7/11; G06T 2207/20021; G06T 2207/30168; G06T 2207/30252; G06T 7/136; G06T 7/0002
See application file for complete search history.

(56) References Cited

U.S. PATENT DOCUMENTS

| | | | | |
|---|---|---|---|---|
| 11,308,624 | B2* | 4/2022 | Kono | G06T 7/11 |
| 2019/0212275 | A1* | 7/2019 | Nozawa | G06T 7/13 |
| 2020/0211194 | A1* | 7/2020 | Ikeda | G06T 7/254 |
| 2021/0088441 | A1* | 3/2021 | Oki | G01N 21/4738 |
| 2021/0089809 | A1* | 3/2021 | Asayama | G06T 7/0002 |
| 2021/0089818 | A1* | 3/2021 | Asayama | G06V 10/56 |
| 2021/0090235 | A1* | 3/2021 | Ikeda | G06V 20/586 |
| 2021/0090236 | A1* | 3/2021 | Asayama | B60R 16/03 |
| 2021/0090237 | A1* | 3/2021 | Asayama | G06T 7/0002 |
| 2021/0090260 | A1* | 3/2021 | Ikeda | G06T 7/162 |
| 2021/0090262 | A1* | 3/2021 | Kono | G06T 7/12 |

(Continued)

FOREIGN PATENT DOCUMENTS

| | | | |
|---|---|---|---|
| JP | 2004093146 A | * | 3/2004 |
| JP | 2019-106643 A | | 6/2019 |
| JP | 2019-106644 A | | 6/2019 |

*Primary Examiner* — Bobbak Safaipour
(74) *Attorney, Agent, or Firm* — Oliff PLC (57) ABSTRACT

A deposit detection device according to an embodiment includes a detection module and an identification module. The detection module detects a small region as a candidate region for a deposit region corresponding to a deposit adhering to an imaging device, based on brightness information for each of small regions into which a predetermined region in an image captured by the imaging device is divided. The identification module identifies the candidate region as the deposit region when undulation change in brightness distribution of pixels included in the candidate region detected by the detection module is within a predetermined range.

5 Claims, 8 Drawing Sheets

(56) References Cited

U.S. PATENT DOCUMENTS

2021/0090268 A1\* 3/2021 Ikeda ........................ G06T 7/62
2022/0196551 A1\* 6/2022 Nakamura ............. G01N 21/95
2022/0244539 A1\* 8/2022 Van Heugten ........... G09G 3/32

\* cited by examiner

| | | POSITION | | | | | | |
|---|---|---|---|---|---|---|---|---|
| | | D1 | D2 | D3 | D4 | D5 | D6 | D7 |
| AMOUNT OF CHANGE | MAXI-MUM | 0 | 0 | 0 | 0 | — | — | — |
| | MINI-MUM | 0 | 0 | 0 | 0 | — | — | — |

FIG.7B

| | | POSITION | | | | | | |
|---|---|---|---|---|---|---|---|---|
| | | D1 | D2 | D3 | D4 | D5 | D6 | D7 |
| AMOUNT OF CHANGE | MAXI-MUM | +1 | +1 | +1 | +1 | +1 | +1 | +1 |
| | MINI-MUM | -1 | -1 | -1 | -1 | -1 | -1 | -1 |

AND
NUMBER OF AMOUNTS OF BRIGHTNESS CHANGE IS FOUR OR MORE

FIG.8

DEPOSIT DETECTION DEVICE AND DEPOSIT DETECTION METHOD

CROSS-REFERENCE TO RELATED APPLICATION

This application is based upon and claims the benefit of priority of the prior Japanese Patent Application No. 2019-172217, filed on Sep. 20, 2019, the entire contents of which are incorporated herein by reference.

FIELD

The embodiments discussed herein are directed to a deposit detection device and a deposit detection method.

BACKGROUND

Conventionally, a deposit detection device is known which detects a region (hereinafter referred to as a deposit region) corresponding to a deposit adhering to a lens of an imaging device by calculating brightness information for each of small regions into which a predetermined region of a captured image is divided, and extracting a small region having variation in the calculated brightness information in a predetermined range (for example, refer to Japanese Laid-open Patent Publication No. 2019-106644).

Unfortunately, the conventional technique has room for improvement in detecting a deposit with high accuracy. For example, in a case of an image captured at night, the entire image is dark and variation in brightness information is small, so that a deposit region may be erroneously detected.

SUMMARY

A deposit detection device according to an embodiment includes a detection module and an identification module. The detection module detects a small region as a candidate region for a deposit region corresponding to a deposit adhering to an imaging device, based on brightness information for each of small regions into which a predetermined region in an image captured by the imaging device is divided. The identification module identifies the candidate region as the deposit region when undulation change in brightness distribution of pixels included in the candidate region detected by the detection module is within a predetermined range.

DESCRIPTION OF EMBODIMENTS

Embodiments of a deposit detection device and a deposit detection method disclosed by the subject application will be described in detail below with reference to the accompanying drawings. It should be noted that the present invention is not limited by the embodiments illustrated below.

Figure 1:
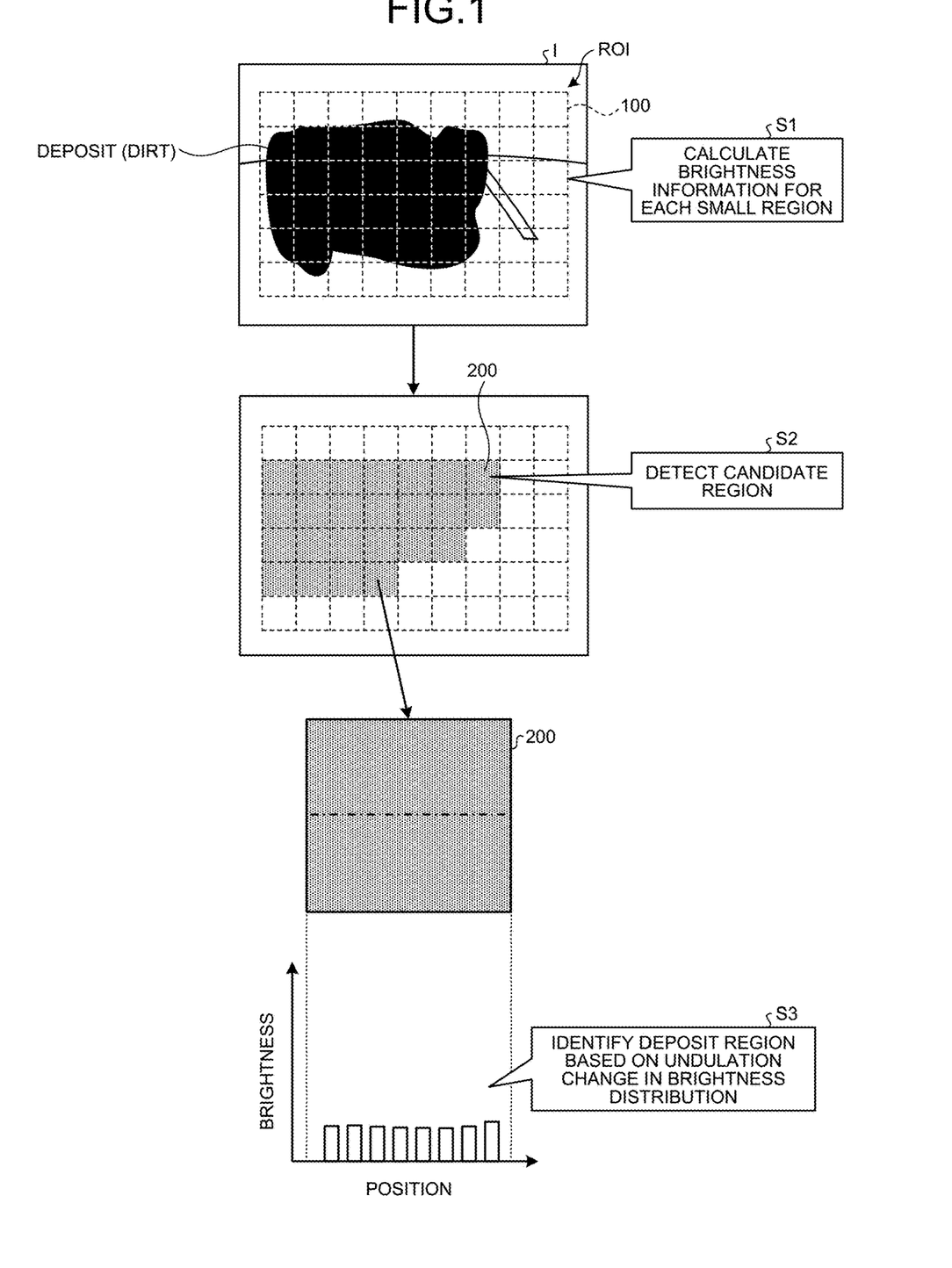
FIG. 1 is a diagram illustrating an overview of a deposit detection method according to an embodiment.

First, referring to FIG. 1, an overview of the deposit detection method according to an embodiment will be described. FIG. 1 is a diagram illustrating an overview of the deposit detection method according to the embodiment. The upper section of FIG. 1 illustrates an image I (hereinafter, captured image I) captured, for example, in a state in which a light-blocking deposit such as dirt adheres to a lens of a camera (an example of imaging device) mounted on a vehicle. When such a light-blocking deposit adheres, a deposit region in the captured image I is in a blocked-up shadow state. The light-blocking deposit includes dirt as well as insects and dust.

A conventional deposit detection method will now be described. Conventionally, a deposit region corresponding to a deposit adhering to a lens of an imaging device is detected by calculating brightness information for each of small regions (small regions 100 illustrated in FIG. 1) into which a predetermined region (a predetermined region ROI illustrated in FIG. 1) in a captured image is divided, and extracting a small region having variation in the calculated brightness information in a predetermined range.

Unfortunately, the conventional deposit detection method has room for improvement in detecting a deposit with high accuracy. For example, in a case of an image captured at night, the entire image is dark and variation in brightness information is small, so that a deposit region may be erroneously detected although a deposit does not adhere.

Then, in the deposit detection method according to the embodiment, the detected deposit region is set as a candidate region 200, and the deposit region is finally identified based on undulation change in brightness distribution in the candidate region 200.

Specifically, first of all, in the deposit detection method according to the embodiment, brightness information is calculated for each of small regions 100 into which a predetermined region ROI in the captured image I is divided (step S1). Subsequently, in the deposit detection method according to the embodiment, the small region 100 is detected as the candidate region 200 for a deposit region corresponding to a deposit adhering to the camera, based on the calculated brightness information of the small region 100 (step S2).

Subsequently, in the deposit detection method according to the embodiment, the deposit region is identified, based on undulation change in brightness distribution of pixels included in the candidate region 200 (step S3). Specifically, in the deposit detection method according to the embodiment, the candidate region 200 is identified as the deposit region when undulation change in brightness distribution of pixels included in the candidate region 200 is within a predetermined range.

For example, the lower section of FIG. 1 illustrates a graph of a brightness distribution in one candidate region 200 (small region 100). Such a graph of a brightness distribution represents a brightness distribution of one pixel row arranged in the horizontal direction of the candidate region 200. In such a graph, brightness data of a bar corresponding to each "position" in the horizontal axis represents a representative value of brightness in a unit region obtained by dividing one pixel row by a predetermined number of pixels. The unit region, calculation of the representative value, and the like will be described later.

As illustrated in the graph of a brightness distribution in FIG. 1, in a case of a deposit such as dirt, undulation change in brightness distribution in the candidate region 200 falls within a predetermined range, and therefore the undulation shape of the brightness distribution is flat. Then, in the deposit detection method according to the embodiment, the deposit region is identified using the characteristic of the undulation shape of the brightness distribution being flat. With this configuration, a deposit can be detected with high accuracy.

Figure 2:
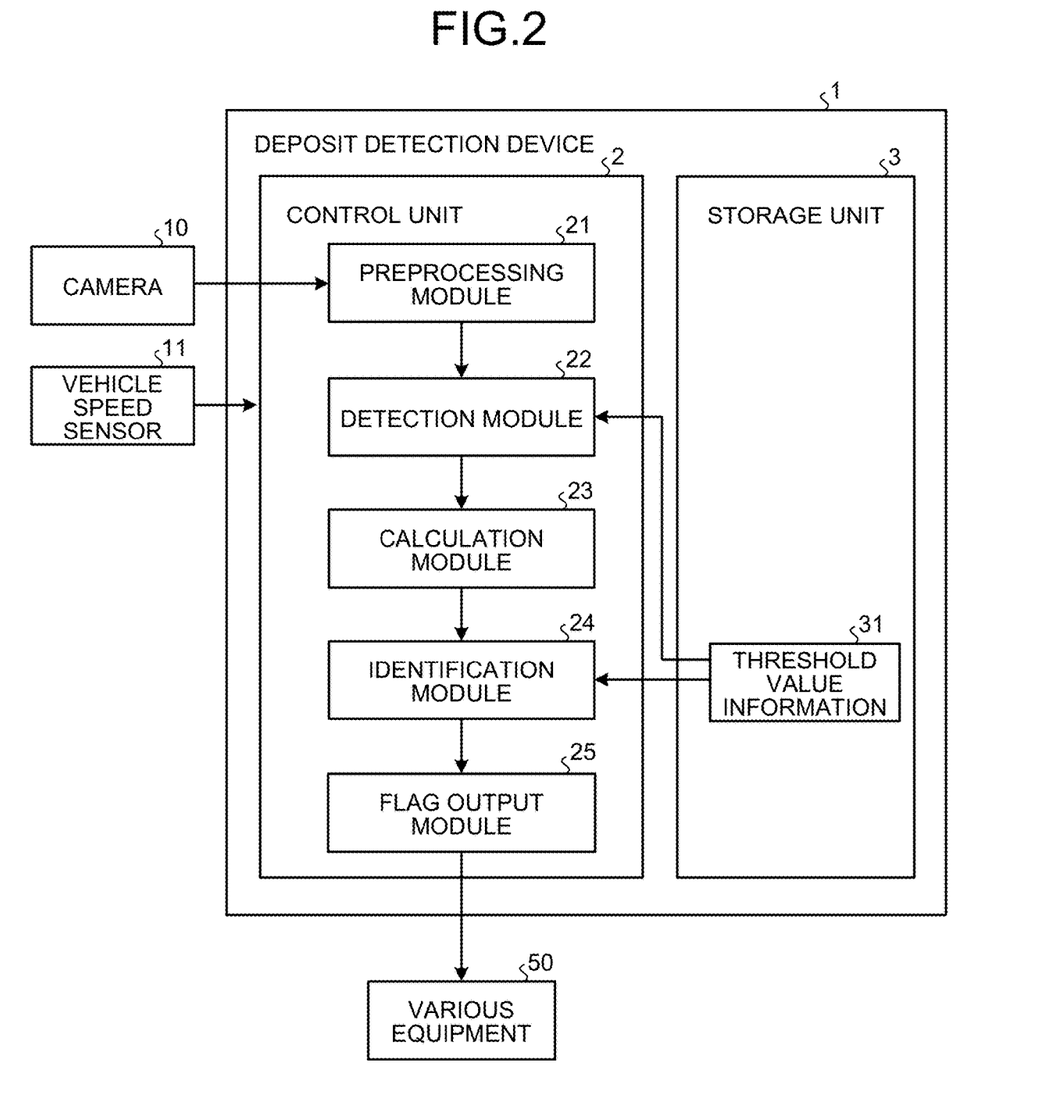
FIG. 2 is a block diagram illustrating a configuration of a deposit detection device according to the embodiment.

Referring now to FIG. 2, a configuration of a deposit detection device 1 according to an embodiment will be described. FIG. 2 is a block diagram illustrating the configuration of the deposit detection device 1 according to an embodiment. As illustrated in FIG. 2, the deposit detection device 1 according to an embodiment is connected with a camera 10, a vehicle speed sensor 11, and various equipment 50. Although the deposit detection device 1 illustrated in FIG. 2 is a separate component from the camera 10 and the various equipment 50, the deposit detection device 1 may be integrated with at least one of the camera 10 and the various equipment 50.

The camera 10 is, for example, an on-vehicle camera including a lens such as a fish-eye lens and an imager such as a charge-coupled device (CCD) or a complementary metal oxide semiconductor (CMOS). The cameras 10 are provided, for example, at positions where images at the front, back, left side, and right side of the vehicle can be captured, and output the captured images I to the deposit detection device 1.

The vehicle speed sensor 11 is a sensor that detects the speed of the vehicle. The vehicle speed sensor 11 outputs information on the detected vehicle speed to the deposit detection device 1.

The various equipment 50 acquires the detection result from the deposit detection device 1 to perform a variety of control on the vehicle. The various equipment 50 includes, for example, a display device indicating that a deposit adheres to the lens of the camera 10 and notifies the user of an instruction to wipe off the deposit, a removal device that ejects fluid, gas, or the like toward the lens to remove the deposit, and a vehicle control device for controlling autonomous driving, for example.

As illustrated in FIG. 2, the deposit detection device 1 according to an embodiment includes a control unit 2 and a storage unit 3. The control unit 2 includes a preprocessing module 21, a detection module 22, a calculation module 23, an identification module 24, and a flag output module 25. The storage unit 3 stores therein threshold value information 31.

Here, the deposit detection device 1 includes, for example, a computer having a central processing unit (CPU), a read-only memory (ROM), a random-access memory (RAM), a flash memory, and an input-output port, and a variety of circuits.

The CPU of the computer reads and executes a computer program stored in the ROM, for example, to function as the preprocessing module 21, the detection module 22, the calculation module 23, the identification module 24, and the flag output module 25 of the control unit 2.

At least one or all of the preprocessing module 21, the detection module 22, the calculation module 23, the identification module 24, and the flag output module 25 of the control unit 2 may be configured by hardware such as an application specific integrated circuit (ASIC) and a field-programmable gate array (FPGA).

The storage unit 3 corresponds to, for example, the RAM, the ROM, and the flash memory. The RAM, the ROM, and the flash memory can store therein the threshold value information 31 and information of a variety of computer programs. The deposit detection device 1 may acquire the computer program and/or a variety of information described above through another computer connected via a wired or wireless network or a portable recording medium.

The threshold value information 31 stored in the storage unit 3 is information including information such as threshold values used in processes in the control unit 2. The information such as threshold values included in the threshold value information 31 is set based on the results verified in advance by experiments or the like.

The preprocessing module 21 performs predetermined preprocessing on the captured image I captured by the camera 10.

Specifically, the preprocessing module 21 performs a pixel thinning process on the acquired captured image I and generates an image having a size smaller than the acquired image. The preprocessing module 21 also generates an integrated image of the sum and the sum of squares of pixel values in the pixels, based on the image subjected to the thinning process. As used herein, the pixel value is information corresponding to brightness or an edge of a pixel.

In this way, the deposit detection device 1 can accelerate calculation in the processes in the subsequent stages by performing the thinning process on the acquired image and generating the integrated image and can reduce the process time for detecting a deposit.

The preprocessing module 21 may perform a smoothing process for each pixel, using a smoothing filter such as an averaging filter. The preprocessing module 21 does not necessarily perform the thinning process and may generate an integrated image of the captured image I having the same size as that of the acquired image.

The preprocessing module 21 outputs the captured image I that is an integrated image to the detection module 22.

The detection module 22 detects a small region 100 as a candidate region 200 for a deposit region based on brightness information for each of small regions 100 into which a predetermined region ROI in the captured image I is divided.

Specifically, the detection module 22 first sets a predetermined region ROI and small regions 100 in the captured image I. The predetermined region ROI is a rectangular region preset according to the characteristics of the camera 10 and is a region, for example, excluding a vehicle body region and a housing region of the camera 10. The small regions 100 are rectangular regions formed by dividing the predetermined region ROI in the horizontal direction and the vertical direction. For example, each small region 100 is a region including 40×40 pixels, but the number of pixels included in the small region 100 can be set as desired.

Subsequently, the detection module 22 calculates brightness information indicating a feature amount of brightness for each small region 100. Specifically, the detection module 22 calculates an average value of brightness and a standard deviation of brightness as a feature amount, for each small region 100. The detection module 22 also calculates a feature amount of brightness (an average value of brightness and a standard deviation of brightness) in the entire predetermined region ROI.

Subsequently, the detection module 22 calculates a variation in feature amount of brightness in the captured images I from the past to the present. Specifically, the detection module 22 calculates, as a variation, a first difference that is a difference in average value of brightness in the small region 100 at the same position in the past and at present in the captured images I. That is, the detection module 22 calculates, as a variation, the first difference between the average value of brightness in the past and the average value of brightness at present for the corresponding small region 100.

The detection module 22 also calculates a second difference that is a difference in standard deviation of brightness in the small region 100 at the same position in the past and at present of the captured images I. That is, the detection module 22 calculates, as a variation, the second difference between the standard deviation of brightness in the past and the standard deviation of brightness at present for the corresponding small region 100.

Subsequently, the detection module 22 determines whether the brightness information satisfies a predetermined candidate condition, for each individual small region 100. Specifically, the detection module 22 determines that the candidate condition is satisfied when the variation in feature amount of brightness of the small region 100 in the captured images I in the past and at present falls within a predetermined threshold value range.

Subsequently, when the number of small regions 100 in which a candidate count number indicating the number of times the brightness information satisfies the candidate condition reaches a predetermined number or larger, is equal to or larger than a predetermined number, the detection module 22 detects the predetermined number of small regions 100 as a candidate region 200. That is, the detection module 22 detects, as a candidate region 200, a set of a predetermined number of small regions 100 in which the state of brightness information satisfying the candidate condition continues a predetermined number of times or more in the captured images I of a few frames from the past to the present.

The detection module 22 outputs information on the detected candidate region 200 to the calculation module 23.

The calculation module 23 calculates information on a brightness distribution of pixels included in the candidate region 200 detected by the detection module 22. First, the calculation module 23 extracts a pixel row from which a brightness distribution is to be calculated, in the candidate region 200.

Figure 3:
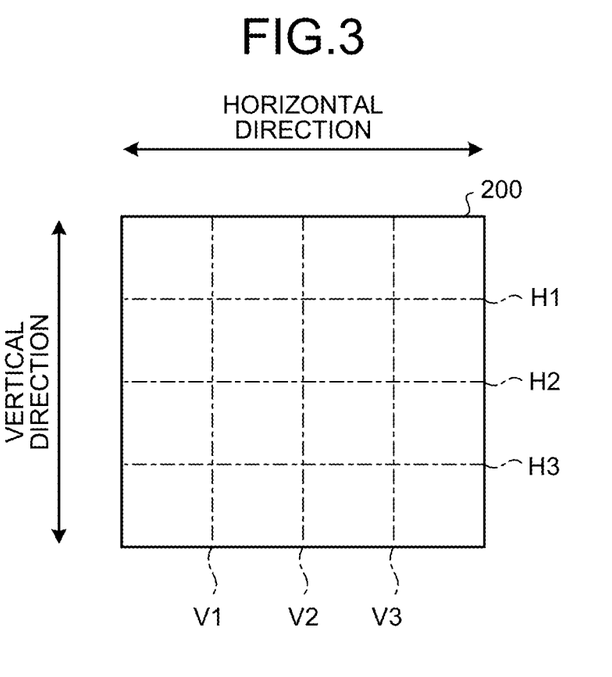
FIG. 3 is a diagram illustrating pixel rows to be extracted.

FIG. 3 is a diagram illustrating pixel rows to be extracted. As illustrated in FIG. 3, the calculation module 23 extracts three pixel rows H1 to H3 in the horizontal direction and three pixel rows V1 to V3 in the vertical direction in the captured image I.

The extracted pixel rows may be pixel rows in one of the horizontal direction and the vertical direction. The number of pixel rows to be calculated is not limited to three and may be two or less or four or more.

The intervals between the extracted three pixel rows H1 to H3 in the horizontal direction and the intervals between the extracted three pixel rows V1 to V3 in the vertical direction may be regular intervals or may be different intervals.

The calculation module 23 then calculates a representative value of brightness for each unit region having a predetermined number of pixels as a unit in each pixel row extracted from the candidate region 200. This point will be described with reference to FIG. 4 and FIG. 5.

Figure 4:
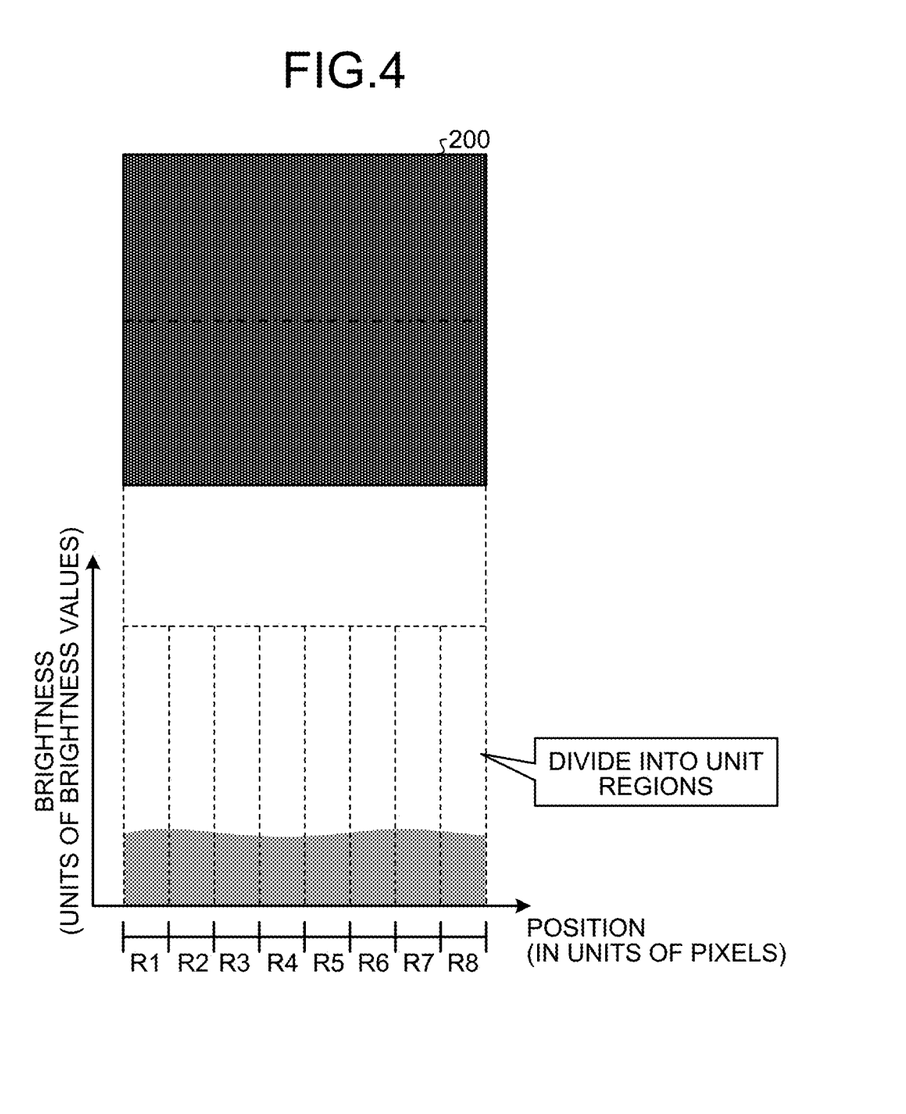
FIG. 4 is a diagram illustrating a calculation process for a representative value of brightness by a calculation module.
Figure 5:
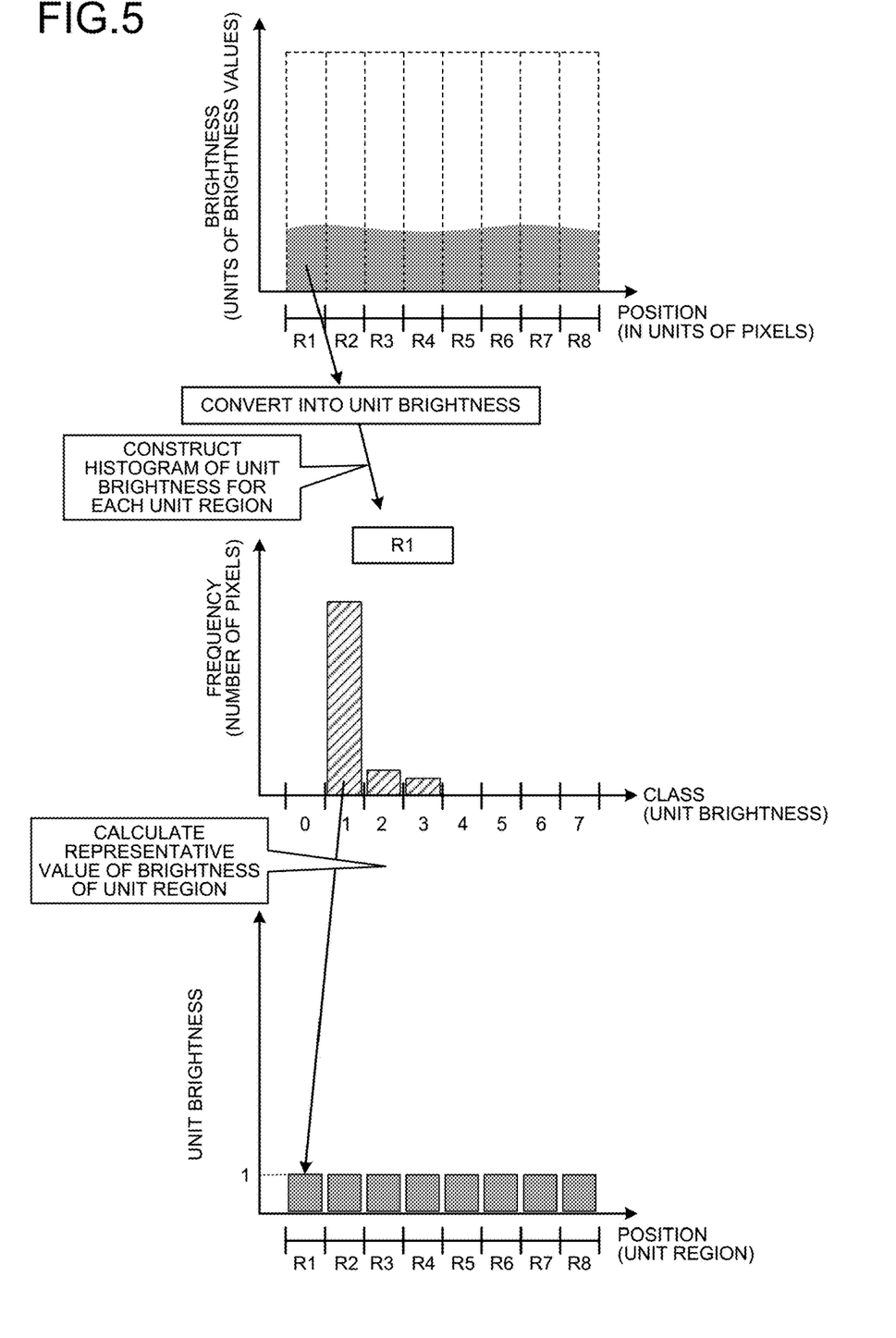
FIG. 5 is a diagram illustrating the calculation process for a representative value of brightness by the calculation module.

FIG. 4 and FIG. 5 are diagrams illustrating a calculation process for a representative value of brightness by the calculation module 23. First, referring to FIG. 4, a method of setting unit regions performed by the calculation module 23 will be described. FIG. 4 illustrates a brightness distribution of one pixel row in the horizontal direction.

As illustrated in FIG. 4, the calculation module 23 divides a pixel row in the horizontal direction into, for example, eight unit regions R1 to R8 (which may be collectively referred to as unit regions R). For example, when the candidate region 200 (small region 100) is a 40×40 pixel region, the number of pixels in each unit region R (when equally divided) is "5". The widths (number of pixels) of the unit regions R1 to R8 may be the same (that is, the number of pixels obtained by equally dividing the pixel row) or the widths may be different.

The number of divisions of the unit regions R is not limited to eight and any number may be set. In this way, a pixel row is grouped into a predetermined number of unit regions R, whereby the amount of computation by the calculation module 23 and the identification module 24 at the subsequent stages can be suppressed.

Subsequently, as illustrated in FIG. 5, the calculation module 23 calculates a representative value of brightness for each unit region R. As illustrated in the upper section of FIG. 5, first, the calculation module 23 converts the brightness value (for example, 0 to 255) of each pixel into unit brightness, prior to the calculation process for a representative value. In FIG. 5, the brightness values 0 to 255 are equally divided into eight unit pixels ("0" to "7" depicted in the middle section of FIG. 5). However, the number of unit pixels may be set as desired. With this process, since the brightness of a brightness distribution can be reduced to the number of unit brightness, the process loads at the subsequent stages can be reduced.

The calculation module 23 then constructs a histogram of unit brightness for each of the unit regions R1 to R8. In the middle section of FIG. 5, a histogram of the unit region R1 is illustrated, in which the class is the unit brightness "0" to "7" and the frequency is the number of pixels. The calculation module 23 constructs a histogram for each of the unit regions R1 to R8.

As illustrated in the lower section of FIG. 5, the calculation module 23 then calculates a representative value of brightness for each of the unit regions R1 to R8 based on the constructed histogram. For example, the calculation module 23 calculates the unit pixel at the class with the mode (in FIG. 5, the class "1") in the histogram as a representative value of brightness in the unit region R1. This process can reduce the number of pieces of data of the brightness distribution from the number of pixels to the number of unit regions R, thereby reducing the process loads at the subsequent stages.

The calculation module 23 uses the unit pixel with the mode as a representative value. However, the embodiment is not limited thereto and, for example, the median value or the average value in the histogram may be used as a representative value.

The calculation process is not limited to a calculation process using a representative value based on a histogram, and, for example, the calculation module 23 may calculate the average value of brightness values for each unit region R and use the unit brightness corresponding to such an average value as a representative value of brightness.

Although the calculation module 23 uses unit brightness as a representative value, for example, the average value of brightness values or other values in the unit region R may be used as it is as a representative value. That is, the representative value may be represented by unit brightness or may be represented by a brightness value.

Figure 6:
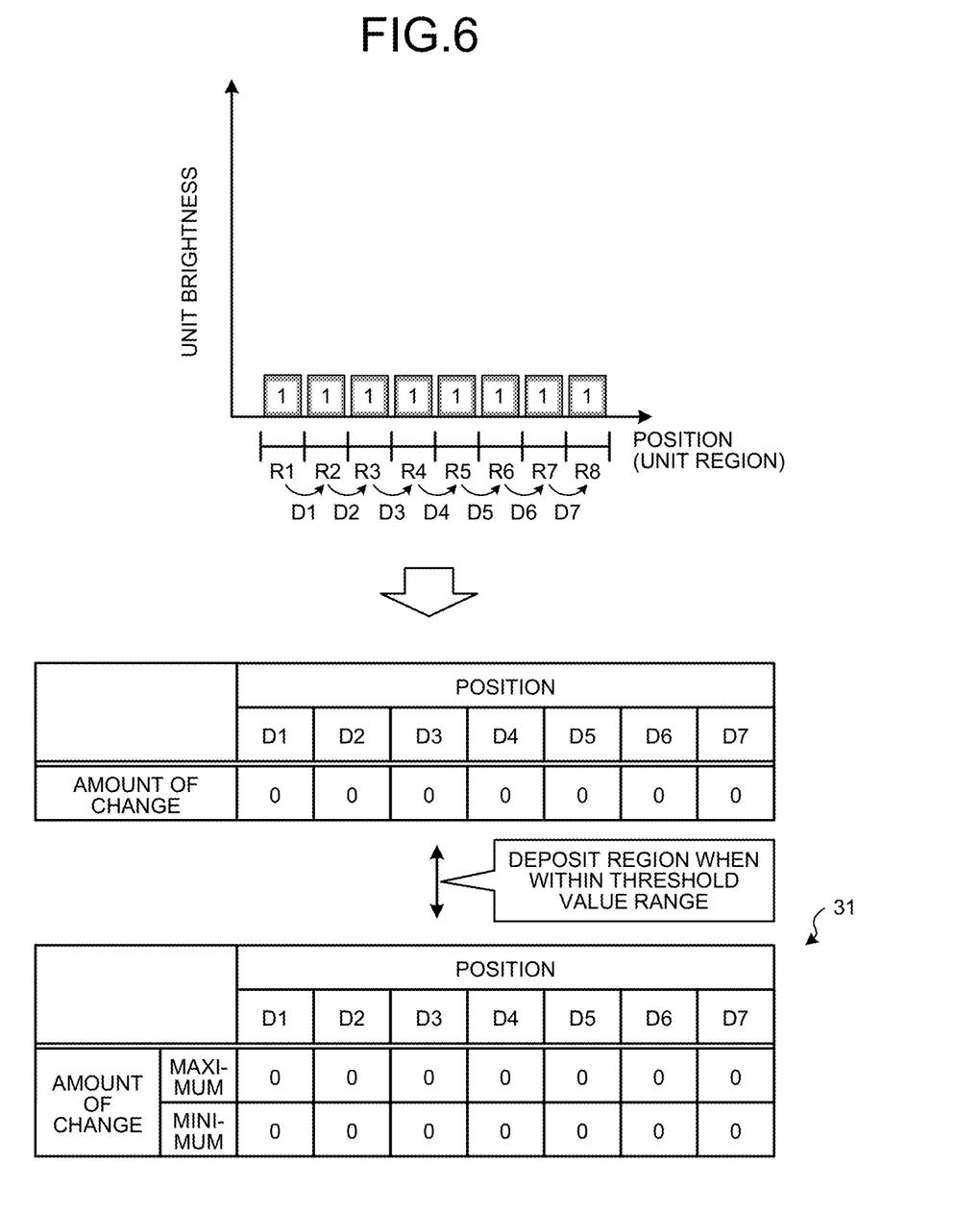
FIG. 6 is a diagram illustrating a process by an identification module.
Figure 7A:
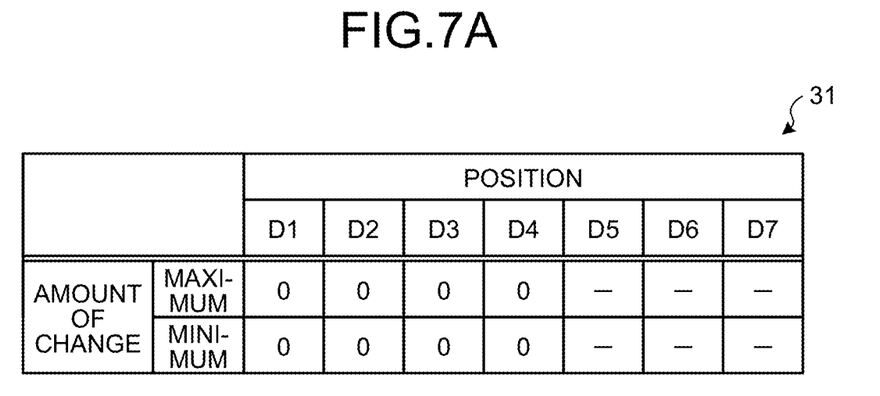
FIG. 7A is a diagram illustrating the process by the identification module.
Figure 7B:
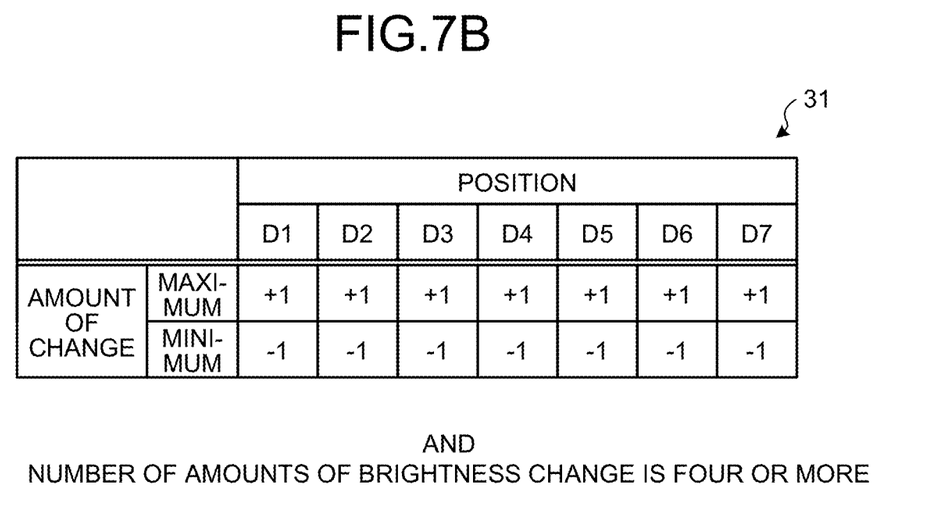
FIG. 7B is a diagram illustrating the process by the identification module.

Returning to FIG. 2, the identification module 24 is described. The identification module 24 identifies the candidate region 200 as a deposit region when undulation change in brightness distribution of pixels included in the candidate region 200 detected by the detection module 22 is within a predetermined range. Specifically, the identification module 24 identifies the candidate region 200 as a deposit region when undulation change in brightness distribution in the vertical direction or in the horizontal direction of the candidate region 200 is within a predetermined range. Referring now to FIG. 6 to FIG. 7B, an identification process by the identification module 24 will be described.

FIG. 6 to FIG. 7B are diagrams illustrating the process by the identification module 24. The upper section of FIG. 6 illustrates a brightness distribution (brightness distribution of representative values) in one candidate region 200, in which a representative value for each of the unit regions R1 to R8 is denoted in the bar graph.

The identification module 24 identifies the candidate region 200 as a deposit region when undulation change in representative value of brightness in the unit regions R1 to R8 is within a predetermined range. First, as illustrated in the upper section of FIG. 6, the identification module 24 calculates amounts of change D1 to D7 in unit brightness of the adjacent unit regions R1 to R8. The lower section of FIG. 6 illustrates a table in which the values of the amounts of change D1 to D7 are entered (the table on the upper side).

The identification module 24 identifies the candidate region 200 as a deposit region when the pattern of undulation change in brightness distribution satisfies a predetermined change pattern. Specifically, the identification module 24 performs the identification process by comparing the values of the amounts of change D1 to D7 with the threshold value information 31 stored in the storage unit 3.

The lower section of FIG. 6 illustrates, as an example of the threshold value information 31, an example of a table including respective threshold value ranges of the amounts of change D1 to D7 (the table on the lower side). The identification module 24 identifies the candidate region 200 as a deposit region when the amounts of change D1 to D7 in the candidate region 200 fall within the respective threshold value ranges of the amounts of change D1 to D7 set in the threshold value information 31.

In other words, the identification module 24 identifies the candidate region 200 as a deposit region when the arrangement pattern of numerical values of the amounts of change D1 to D7 in unit brightness of the adjacent unit regions R1 to R8 satisfies the arrangement pattern that is the threshold value range set in the threshold value information 31.

That is, the identification module 24 stores a feature in which the distribution shape of the brightness distribution of the candidate region 200 is flat, which is the feature of a deposit such as dirt, as the threshold value range in the threshold value information 31 to perform the identification process.

The identification module 24 can ignore the overall magnitude of brightness values by using the amounts of change D1 to D7 and therefore can reduce erroneous determination caused when the shape of undulation is similar and the magnitude of brightness values is different. Since the magnitude of brightness values can be ignored, there is no need to set a threshold value condition for each brightness value, leading to reduction in the storage capacity for storing the threshold value conditions, and there is no need to perform the identification process for each brightness value, leading to reduction in the processing volume. In addition, the identification module 24 performs the identification process with undulation change in representative value of brightness of the unit regions R and thus can treat values in units of representative values in the identification process, thereby reducing the process loads.

Since the maximum and the minimum of the amounts of change D1 to D7 are set to provide a range in the threshold value information 31, the deposit region can be identified even when the brightness distribution is deformed to some extent.

FIG. 6 illustrates the case where the threshold value ranges are set for all the amounts of change D1 to D7 in the threshold value information 31. However, the threshold value range may be set for some of the amounts of change D1 to D7 as illustrated in FIG. 7A.

Specifically, FIG. 7A illustrates a case where a threshold value range of the amounts of change D1 to D4 is set. For example, a threshold value range of the amounts of change D2 to D5 may be set. In other words, such a threshold value range may be set that four amounts of change "0" are successive.

In this way, the threshold value information 31 includes information in which a threshold value range of some amounts of change is set, of the amounts of change D1 to D7. The identification module 24 then identifies the candidate region 200 as a deposit region when four amounts of change "0" are successive at any position, of the amounts of change D1 to D7 in the candidate region 200.

With this configuration, even when light is blocked by a deposit in a part of the candidate region 200, the candidate region 200 can be identified as a deposit region.

In addition, the position in the amounts of change in which a threshold value range is to be set is shifted, whereby a deposit region can be detected with high accuracy even when the deposit region in the candidate region 200 is displaced.

FIG. 7A illustrates the case where the threshold value range of four successive amounts of change is set, of the seven amounts of change D1 to D7. However, the embodiment is not limited to four amounts of change, and a threshold value range of three or less amounts of change or five or more amounts of change may be set.

Although FIG. 7A illustrates the case where the threshold value range of the amounts of change in the threshold value information 31 is "0", the threshold value range of the amounts of change may have a certain range. This point is described with reference to FIG. 7B.

FIG. 7B illustrates a case where the maximum value "+1" and the minimum "−1" are set for all of the seven amounts of change D1 to D7, as a threshold value range of the amounts of change in the threshold value information 31. Then, in the threshold value information 31 illustrated in FIG. 7B, the number of amounts of change being "0" is provided, in addition to the threshold value range of the seven amounts of change D1 to D7.

That is, the identification module 24 identifies the candidate region 200 as a deposit region when undulation change in representative value of brightness is within a predetermined range and the number of differences in representative value of brightness between the adjacent unit regions R being zero is equal to or larger a predetermined number.

In the example illustrated in FIG. 7B, the candidate region 200 is identified as a deposit region when, of the seven amounts of change D1 to D7, four or more amounts of change are "0" and the remaining amounts of change are in the threshold value range with the maximum value "+1" and the minimum value "−1".

With this process, variation of representative values to some extent due to noise or the like can be permitted while the feature in which the undulation shape of the brightness distribution of a deposit region is flat is grasped.

As described above, the identification module 24 can identify a deposit region with high accuracy by performing the identification process based on undulation change in brightness distribution in the vertical direction or the horizontal direction of the candidate region.

FIG. 6, FIG. 7A, and FIG. 7B illustrate the case where the identification module 24 performs determination as to whether the calculated amount of change in representative value of brightness falls within the threshold value range in the threshold value information 31. However, the identification process may be performed by mapping undulation change in brightness distribution based on the threshold value range of the amounts of change D1 to D7.

The identification module 24 outputs information on the identified deposit region to the flag output module 25.

The identification module 24 may identify the candidate region 200 as a deposit region when a case where undulation change in brightness distribution of the candidate region 200 is within a predetermined range continues a predetermined number or more.

The flag output module 25 outputs a deposit flag corresponding to the number of deposit regions identified by the identification module 24. Specifically, the flag output module 25 outputs a deposit flag ON to the various equipment 50 when the number of deposit regions is equal to or larger than a predetermined number. On the other hand, the flag output module 25 outputs a deposit flag OFF to the various equipment 50 when the number of deposit regions is smaller than the predetermined number.

Figure 8:
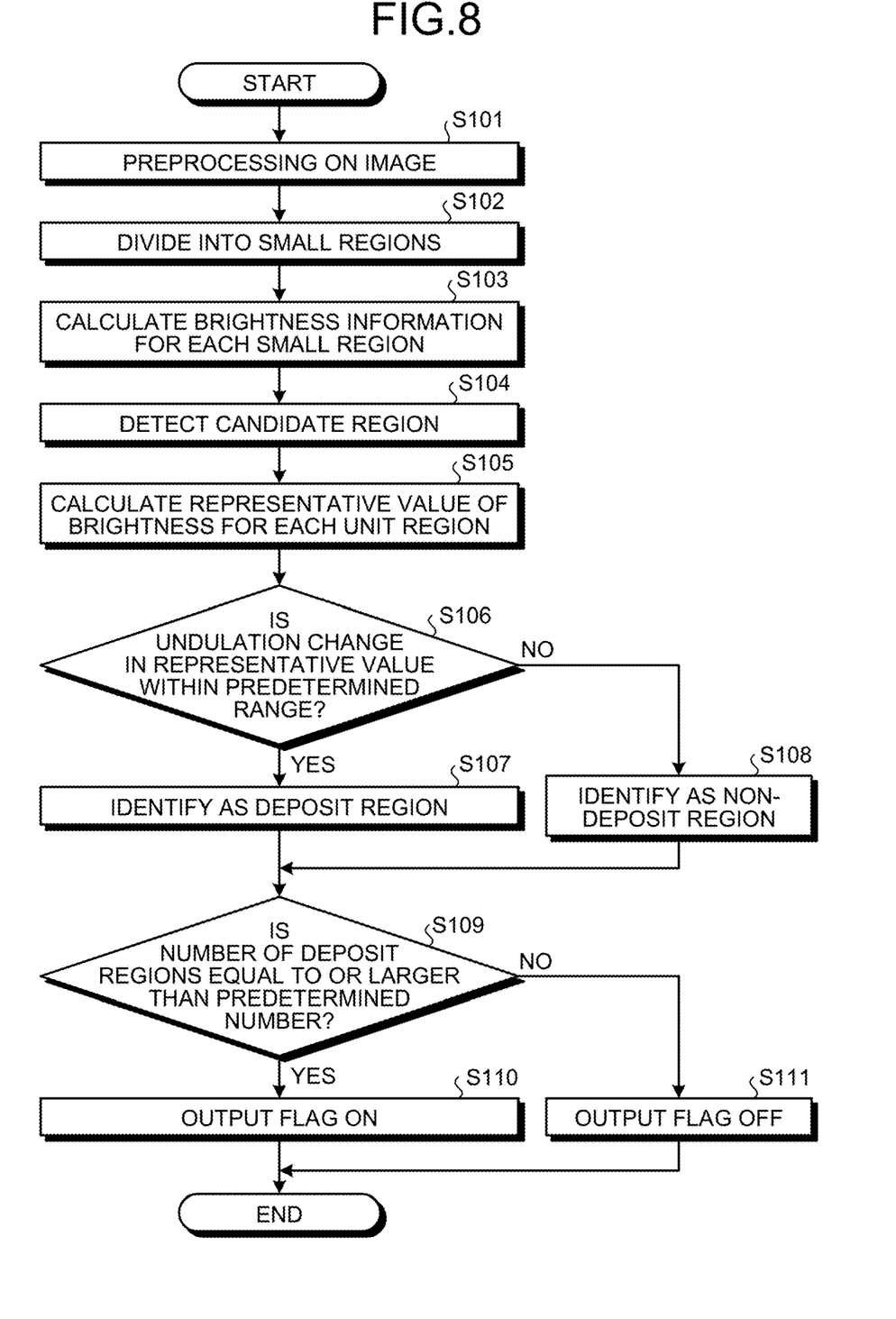
FIG. 8 is a flowchart illustrating a procedure of a process performed by the deposit detection device according to the embodiment.

Referring now to FIG. 8, the procedure of the process performed by the deposit detection device 1 according to an embodiment will be described. FIG. 8 is a flowchart illustrating the procedure of the process performed by the deposit detection device 1 according to an embodiment.

As illustrated in FIG. 8, first of all, the preprocessing module 21 acquires an image captured by the camera 10 and performs preprocessing on the acquired captured image I (step S101). As used herein, the preprocessing is a process of performing a gray-scale process and the thinning process and thereafter generating an integrated image based on pixel values of the reduced image.

Subsequently, the detection module 22 divides a predetermined region ROI in the captured image I into small regions 100 (step S102).

Subsequently, the detection module 22 calculates brightness information indicating a feature amount of brightness for each small region (step S103). The feature amount of brightness is, for example, an average value of brightness and a standard deviation of brightness.

Subsequently, the detection module 22 detects a candidate region 200 for a deposit region, based on the calculated brightness information (step S104).

Subsequently, the calculation module 23 calculates a representative value of brightness for each unit region R having a predetermined number of pixels as a unit in the candidate region 200 detected by the detection module 22 (step S105).

Subsequently, the identification module 24 determines whether undulation change in representative value calculated by the calculation module 23 is within a predetermined range (step S106).

If the undulation change in representative value in the candidate region 200 is within the predetermined range (Yes at step S106), the identification module 24 identifies the candidate region 200 as a deposit region (step S107).

On the other hand, if the undulation change in representative value in the candidate region 200 is outside the predetermined range (No at step S106), the identification module 24 identifies the candidate region 200 as a non-deposit region that is not a deposit region (step S108).

Subsequently, the flag output module 25 determines whether the number of identified deposit regions is equal to or larger than a predetermined number (step S109).

If the number of identified deposit regions is equal to or larger than the predetermined number (Yes at step S109), the flag output module 25 outputs the deposit flag ON to the various equipment 50 (step S110) and terminates the process.

On the other hand, if the number of identified deposit regions is smaller than the predetermined number (No at step S109), the flag output module 25 outputs the deposit flag OFF to the various equipment 50 (step S111) and terminates the process.

As described above, the deposit detection device 1 according to the embodiment includes the detection module 22 and the identification module 24. The detection module 22 detects a small region 100 as a candidate region 200 for a deposit region corresponding to a deposit adhering to an imaging device, based on brightness information for each of the small regions 100 into which a predetermined region ROI in a captured image I captured by the imaging device (camera 10) is divided. The identification module 24 identifies the candidate region 200 as the deposit region when undulation change in brightness distribution of pixels included in the candidate region 200 detected by the detection module 22 is within a predetermined range. With this configuration, a deposit can be detected with high accuracy.

In the foregoing embodiment, the captured image I captured by a camera mounted on a vehicle is used. However, the captured image I may be, for example, a captured image I captured by a security camera or a camera installed on a street lamp. That is, the captured image I may be any captured image captured by a camera with a lens to which a deposit may adhere.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deposit detection device comprising:
a detection module configured to detect a small region as a candidate region for a deposit region corresponding to a deposit adhering to an imaging device, based on brightness information for each of small regions into which a predetermined region in an image captured by the imaging device is divided; and
an identification module configured to identify the candidate region as the deposit region when undulation change in brightness distribution of pixels included in the candidate region detected by the detection module is within a predetermined range.

2. The deposit detection device according to claim 1, wherein the identification module identifies the candidate region as the deposit region when the undulation change in the brightness distribution in a vertical direction or a horizontal direction of the candidate region is within a predetermined range.

3. The deposit detection device according to claim 1, further comprising a calculation module configured to calculate a representative value of brightness for each unit region having a predetermined number of pixels as a unit in the candidate region, wherein
the identification module identifies the candidate region as the deposit region when undulation change in the representative value of brightness is within a predetermined range.

4. The deposit detection device according to claim 3, wherein the identification module identifies the candidate region as the deposit region when the undulation change in the representative value of brightness is within a predetermined range and number of differences in the representative value between the unit regions adjacent to each other being zero is equal to or larger than a predetermined number.

5. A deposit detection method comprising:
detecting a small region as a candidate region for a deposit region corresponding to a deposit adhering to an imaging device, based on brightness information for each of small regions into which a predetermined region in an image captured by the imaging device is divided; and
identifying the candidate region as the deposit region when undulation change in brightness distribution of pixels included in the candidate region detected at the detecting is within a predetermined range.

* * * * *